United States Patent [19]

Wyman et al.

[11] Patent Number: 4,848,025
[45] Date of Patent: Jul. 18, 1989

[54] AUTOMATIC BAITER FOR FISH TRAPS

[76] Inventors: Edward W. Wyman; Robert E. Wyman, both of P.O. Box 1847, Sitka, Ak. 99835

[21] Appl. No.: 143,379

[22] Filed: Jan. 13, 1988

[51] Int. Cl.$^4$ .............................................. A01K 69/08
[52] U.S. Cl. ....................................... 43/102; 43/100
[58] Field of Search ................ 43/100, 102, 103, 104, 43/105

[56] References Cited

U.S. PATENT DOCUMENTS

| | | | |
|---|---|---|---|
| 693,391 | 2/1902 | Holland | 43/100 |
| 2,111,959 | 3/1938 | Baxter | 43/100 |
| 3,271,894 | 9/1966 | Manno et al. | 43/100 |
| 3,906,655 | 9/1975 | Lowenthal | 43/100 |
| 4,373,286 | 2/1983 | Robison | 43/102 |

*Primary Examiner*—Kurt Rowan

[57] ABSTRACT

In fish traps of the type that are lowered into and left in the water, an improvement comprising automatic baiter apparatus for obtaining live bait fish in the trap after the trap is lowered into the water while inflicting an injury on the live bait fish. In a preferred embodiment for trapping crabs, the automatic baiter apparatus comprises a plurality of molded plastic flexible fingers secured to a rigid frame to form a converging passageway into the trap when the rigid frame is attached to a similar frame on the wall of the trap. A means for injuring the bait fish is provided by a cutting implement attached to one of the flexible fingers such that the cutting implement will penetrate the stomach of the bait fish as it passes through the converging passageway and is gripped by the flexible fingers as they are deflected and spread apart by the body of the bait fish. Optionally, a lure for attracting bait fish may be attached to one of the flexible fingers and a tunnel means may be employed for retaining the injured bait fish in a central region of the trap.

19 Claims, 2 Drawing Sheets

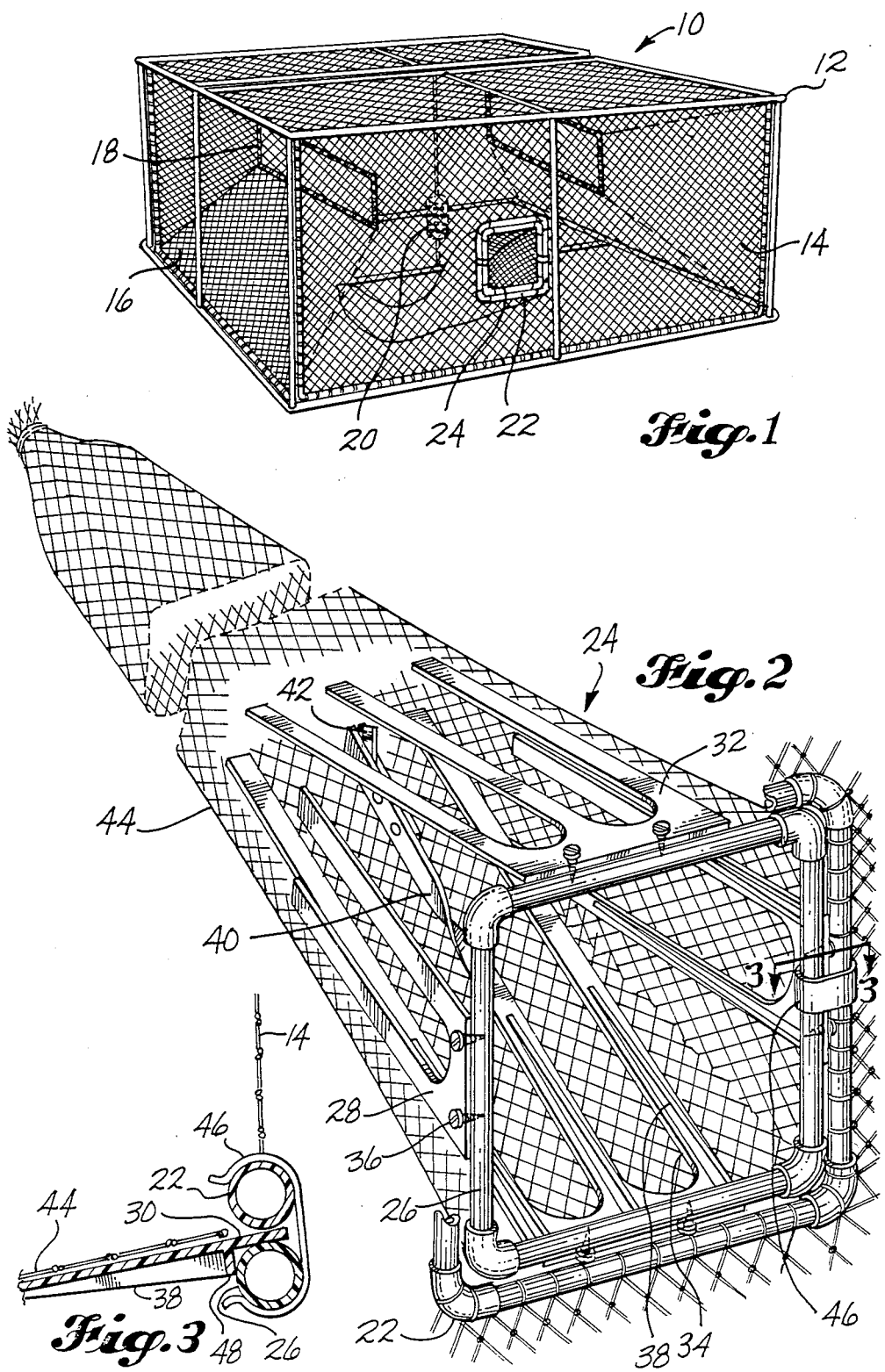

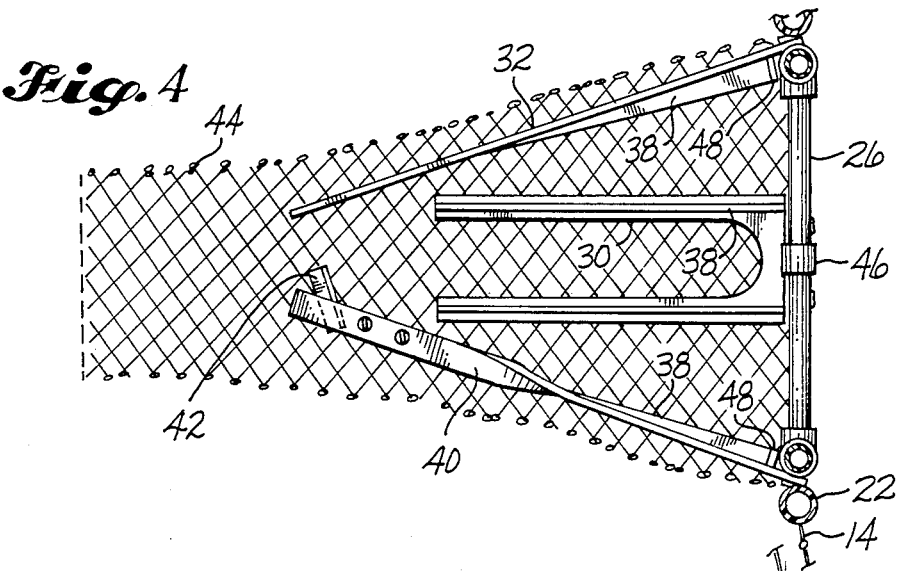
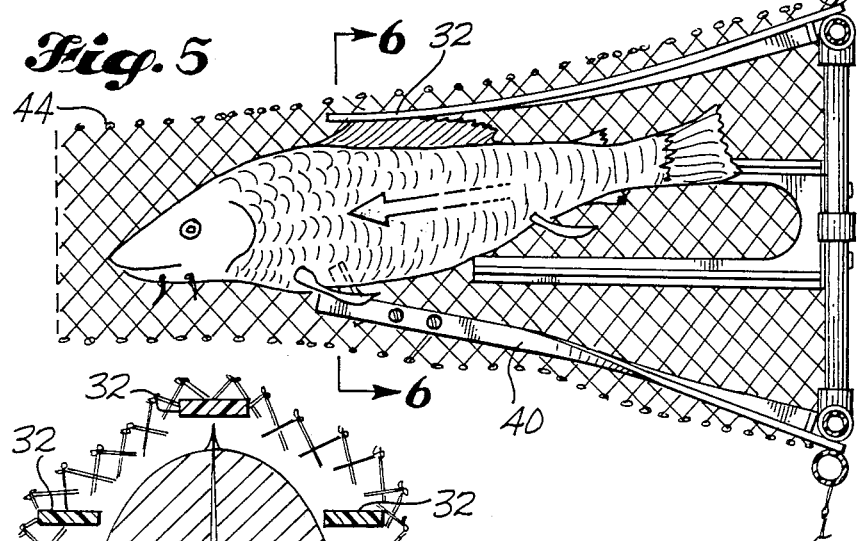
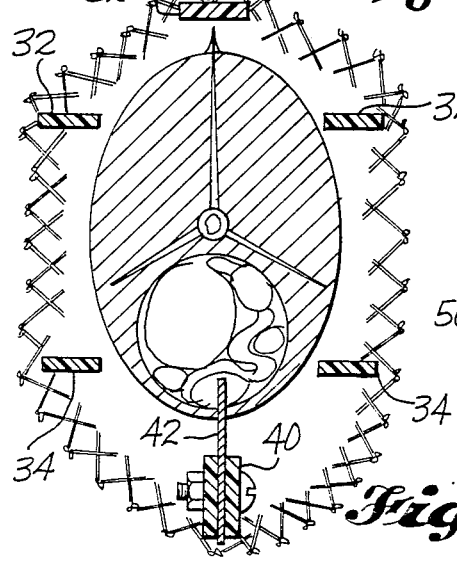
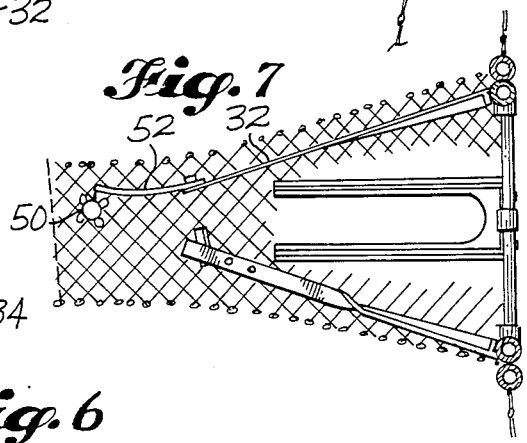

AUTOMATIC BAITER FOR FISH TRAPS

BACKGROUND OF THE INVENTION

This invention pertains to pots or traps for finned fish or shellfish and, more particularly, to an automatic baiting device for providing fresh fish as bait to attract other fish into a trap.

One type of crab trap that is in common use today is shown in U.S. Pat. No. 4,184,283 issued to Robert E. Wyman, a coinventor of the automatic baiting device disclosed here. Such crab traps are formed by steel rods welded together to form a generally rectangular box structure, the walls of which are formed by nylon netting. As shown in the '283 patent, entry tunnels, formed by netting, extend inwardly from opposite ends of the trap and terminate in a rectangular frame secured to the netting, providing an opening through which the crabs fall into, and to the bottom of, the trap.

Bait of pieces of meat such as horsemeat or herring is secured by a hook or canister in a central region of such traps. The bait is not live, and deteriorates rapidly when a crab trap is "soaked" or placed in the water, particularly when the soak is for more than an optimum period of one or two days.

It is a specific object of this invention to provide fresh bait for a crab trap by inducing into the crab trap "ground" or bottom fish and, at the same time, inflicting an injury to the fish to thereby provide an attractive natural bait for crab and other scavenges.

In the past, a great many devices have been proposed for capturing fish and other animals in a trap. Such devices are found in U.S. Patent Office Class 43 and Subclasses 65, 66, 77, 81, 100, 102, 103, and 105 and are shown in the following U.S. Pat. Nos.: 584,226; 1,020,029; 1,034,360; 1,054,344; 1,283,018; 1,388,780; 1,703,288; 1,848,541; 2,578,172; 3,271,894; 3,337,982; 3,541,722; and 4,107,867. When designed for capturing shellfish, or other fish, these devices allow the fish to enter a trap without injury (see, for example, the '867, '894 and '982 patents referenced above). None of these or the above-referenced patents provide any teaching, or even a suggestion, of a device for automatically providing fresh bait for a trap.

Accordingly, it is a general object of this invention to provide means for obtaining fresh and natural bait for a fish trap.

Another object of this invention is to automatically provide fresh and natural bait for a trap of the type used for shellfish after the trap is soaked or placed into the water.

A further object of this invention is to provide a device of the type described which is economical and easy to use and may be readily attached to, and detached from, a shell fish trap.

SUMMARY OF THE INVENTION

The automatic baiter device of this invention is, in a preferred embodiment, adapted to be rapidly attached to, and through, an exterior wall of a crab trap and comprises a rectangular frame suitable for nesting insertion into, and attachment to, a similar but slightly larger frame attached to the wall of a crab trap. A plurality of flexible plastic fingers are attached to and extend inwardly from the frame into the interior of the trap. The fingers are arranged to converge so as to reduce the distance between the fingers as they extend into the trap. A cutting implement is attached to one of the fingers near its free end such that it extends into the passageway formed by the fingers. A fishing lure may be attached to another of the fingers near its free end.

Accordingly, as a ground fish approaches the trap it may be attracted either by the bait in the central region of the trap or by the fish lure attached to the baiting device. If the fish attempts to strike the lure or to gain entry to the trap through the baiting device, the flexible fingers will be spread apart by the body of the fish. As the fish enters the baiting device it will find that it must proceed forward. As is well known, fish can move forward or to the side but are not capable of effective reverse motion. As the fish passes through the opening formed by the converging, and now flexed, fingers, its belly will be slit open by the cutting implement. As a result, the trap will be provided with an injured fish, which is an excellent fresh and natural bait for shellfish and other scavengers.

BRIEF DESCRIPTION OF THE DRAWINGS

FIG. 1 is a perspective view of a crab trap with the automatic baiter device of this invention installed in a side wall of the trap.

FIG. 2 is a larger perspective view of the automatic baiter device, showing its details of construction.

FIG. 3 is a cross-sectional view taken at 3—3 in FIG. 2 and showing a means for attaching the automatic baiter device to a frame in the side wall of the trap.

FIG. 4 is a sectional view of the automatic baiter device of FIG. 2.

FIG. 5 shows a fish in the baiter device and in the process of being injured by it.

FIG. 6 is a cross-section view taken at 6—6 in FIG. 5 and showing the horizontal fingers flexed outwardly and the injury being inflicted on the fish.

FIG. 7 is a sectional view similar to that of FIG. 4 showing a fishing lure attached to an upper finger of the baiter device.

DETAILED DESCRIPTION

With reference to FIG. 1, a generally conventional crab trap 10 is constructed of steel bars 12 which are welded together to form a rectangular box structure with the walls formed by nylon netting 14. Such crab traps are often about seven feet by seven feet by three feet high and weigh up to 600 lbs. each. The opposed end walls 16 are sloped to form converging tunnels which terminate at rectangular frames 18 through which crabs will fall into the trap. A bait container 20 is located in a central region of the trap. In this illustration the rectangular frames 18 are shown to be vertically disposed. Frames 18 are often more horizontal and are secured to each other by cords (not shown) which are pulled taut to cause frames 18 to be drawn to the center of the trap and the opposed end walls 16 to be drawn tight and form the converging tunnels of netting.

FIG. 1 shows a frame 22 which is attached to the near side wall formed by netting 14. The automatic baiting device of this invention is installed into the frame 22 and is secured thereto. For convenience in illustration, the frame 22 is shown to be located on the crab trap 10 just below midway up the side wall. However, it is preferred to locate the frame 22 higher up the side wall so that the baiting device 24 is less accessible to crabs crawling up the side wall netting 14.

As is better shown in FIG. 2, in this embodiment the automatic baiter device 24 includes a rectangular rigid frame 26 consisting of straight plastic pipe members connected by matching corner pieces with adhesive. Side finger assemblies 28 and 30 and upper and lower finger assemblies 32 and 34 are attached by screws 36 to rigid frame 26. As can be seen in FIG. 2, the finger assemblies are arranged to form a converging tunnel which has an open end which is substantially smaller than the opening provided by the frame 26. The side finger assemblies 28 and 30 comprise two longitudinally extending fingers spaced apart by a distance preferably about three times the width of each finger. This relatively wide spacing of the fingers is preferred in order to allow a bait fish to see through the automatic baiter device into the trap. The upper and lower finger assemblies 32 and 34 are similarly configured but in this embodiment comprise three fingers each. The finger assemblies may be molded of polyethylene or ABS plastic. Each finger is flexible and is provided with variable stiffness at the attached ends of the finger assemblies. The ribs 38 preferably run out well past the midpoint of the fingers, although they are shown as somewhat shorter in FIG. 2. The length of the side fingers assemblies 28 and 30 need only be about 70% of the length of the other finger assemblies 32 and 34. The finger assemblies may be formed in a common mold and segmented and cut as required to make the side, upper and lower assemblies. The middle finger 40 of the lower finger assembly 34 is twisted and adapted to secure a means for injuring a fish, shown here as a cutting implement 42, near the free end of finger 40.

In manufacturing this embodiment, heat was applied to the finger 40 and it was twisted by 90 degrees near its midpoint to conveniently receive means for attaching the cutting implement 42, shown here as a single-edge razor blade.

FIG. 2 shows the use of an optional tunnel 44, which may be made from nylon netting. The purpose of the tunnel 44 is to receive and retain fish after they have passed through and been injured by the automatic baiter device of this invention. Tunnel 44 terminates in a closed end and will prevent an injured fish from falling to the bottom of the trap 10, where water currents could cause the fish to move to an inconspicuous place, e.g., to a corner of the bottom of the trap where it would not be readily visible and could be picked at by crabs and other scavengers from outside the trap 10. The tunnel 44 serves to provide a means for retaining injured fish in a central region of the trap 10. As noted previously, a fish does not have the ability to back, only the ability to move forward or to the side. Accordingly, an injured fish will like proceed as far as it can down the length of tunnel 44, which may be of any desired length, so long as it terminates in a closed end.

As shown in FIG. 2, the rigid frame 26 is nested within the frame 22 which is attached to side wall netting 14. The frames 22 and 26 are of similar construction and are sized such that frame 26 may be installed within, but preferably will not pass through, the frame 22. The retaining clip 46 shown installed on the right hand side of the frames provides a means for securing the two frames together. A second clip (not shown) or a similar device would be used to secure the frames together on the left hand, or opposite, side.

FIG. 3 is a cross-sectional view, taken at 3—3 of FIG. 2 and rotated for convenience, which shows the retaining clip 46 securing together the frames 26 and 22. Although the clip 46 has been shown here, other means for securing the frames together may advantageously be used. For example, a heavy rubber band, or bungee cord, to which a hook is attached at one end may be tied to frame 26 at its opposite end and the band stretched tight and the hook attached to the netting 14. Because the band is tied to the frame 26 it will not become separated and lost and therefore may be preferred over the retainer clips 26, shown here for ease of illustration.

Also shown in FIG. 3 is the finger assembly 30 with its variable stiffness flange 38, which terminates at short tranverse flange 48. A short transverse flange 48 preferably extends fully across the width of each of the finger assemblies 28, 30, 32, and 34.

FIG. 4 is a sectional view taken through the automatic baiter device of this invention which is shown in FIG. 2.

FIG. 5 shows a fish within the automatic baiter device. The fingers 32 and 40 have been spread apart by the body of the fish and the razor blade of cutting implement 42 has entered the underbelly of the fish, thereby inflicting an injury to the fish which will result in blood in the water that will attract crabs. As mentioned previously, fish cannot swim backwards with any degree of efficiency. Accordingly, the fish will proceed ahead, probably quite rapidly after the injury is inflicted, into the trap 10 and, if the tunnel 44 is used, toward the closed end of the tunnel 44.

FIG. 6 is a cross-sectional view, taken at 6—6 in FIG. 5, through the automatic baiter device and through the fish itself. The middle flexible fingers 32 and 40 have been displaced Outwardly and the razor blade of the cutting implement 42 can be seen to have entered the belly of the fish.

FIG. 7 is a sectional view similar to that of FIG. 4 in reduced scale, in which a fishing lure 50, of a conventional type, is shown to be attached to finger assembly 32 by an attaching means 52. Fish will tend to gain entry into the trap 10 because of the bait in bait container 20 (shown in FIG. 1). However, the lure 50 will provide an additional inducement for fish to enter the automatic baiter device. If the fish attempts to strike the lure, it will be past the point of no return from the automatic baiter device.

While particular embodiments of the invention have been disclosed herein, it will be readily apparent to persons skilled in the art that numerous changes, modifications and substitutions of equivalent components and means may be made without departing from the spirit of the invention. The disclosed invention has been shown to have utility in connection with the crab fishing industry. However, the automatic baiter concepts may have utility in capturing other fish including but not limited to shellfish and a variety of finned fish. Accordingly, the scope of this invention is to be considered to be limited only by the spirit and scope of the appended claims.

The invention in which an exclusive right is claimed is defined as follows:

1. In fish and shellfish traps of the type that are lowered into and left in the water, the improvement comprising automatic baiter apparatus for obtaining fresh and natural live bait in said trap after the trap has been lowered into the water, said automatic baiter apparatus comprising:

passageway means opening through a wall of said trap;

means for inflicting injury to said live bait as it passes through said passageway means;

wherein said passageway means comprises a rigid frame and flexible finger means secured to said frame; and wherein said means for inflicting an injury comprises a cutting implement secured to said flexible finger means.

2. The automatic baiter apparatus of claim 1 wherein said flexible finger means comprises a plurality of fingers spaced apart by a distance exceeding the average width of each finger.

3. The automatic baiter apparatus of claim 1 wherein said cutting implement comprises a blade attached to one of said fingers.

4. The automatic baiter apparatus of claim 1 wherein said rigid frame is sized and adapted to be secured to a similar frame attached to a wall of said trap and means for securing said rigid frame to said similar frame are provided.

5. The automatic baiter apparatus of claim 1 wherein said rigid frame is rectangular.

6. The automatic baiter apparatus of claim 5 wherein said rigid frame comprises plastic pipe and corner members.

7. The automatic baiter apparatus of claim 6 wherein said flexible fingers are plastic and have a variable stiffness which decreases in a direction away from said rigid frame.

8. The automatic baiter apparatus of claim 1 wherein said flexible fingers means form a passageway converging in a direction away from said rigid frame.

9. The automatic baiter apparatus of claim 1 which comprises means for receiving and retaining said live bait after it has passed through and been injured by the automatic baiter apparatus.

10. The automatic baiter apparatus of claim 9 wherein said means for receiving and retaining said live bait comprises tunnel means formed by netting.

11. The automatic baiter apparatus of claim 2 wherein said plurality of fingers are molded from plastic and have substantially uniform widths and are spaced apart by a distance exceeding three times the average width of each finger.

12. The automatic baiter apparatus of claim 11 wherein said rigid frame is substantially square and said flexible finger means comprises a plurality of fingers attached to the vertical sides of said rigid frame and a plurality of fingers attached to the horizontal sides of said rigid frame and wherein said cutting implement comprises a blade attached to a finger which is secured to the lower of said horizontal sides of said rigid frame.

13. In fish and shellfish traps of the type that are lowered into and left in the water, the improvement comprising automatic baiter apparatus for obtaining fresh and natural live bait in said trap after the trap has been lowered into the water, said automatic baiter apparatus comprising:

passageway means opening through a wall of said trap;

means for inflicting injury to said live bait as it passes through said passageway means; and wherein means for attracting fish into said automatic baiter apparatus is attached to said passageway means.

14. In a fish trap of the type that is lowered into and left in the water, the improvement comprising automatic baiter apparatus for obtaining fresh and natural live bait in said trap after the trap has been lowered into the water while inflicting an injury to said live bait, said automatic baiter apparatus comprising:

passageway means providing an opening through the wall of said trap and comprising flexible finger means secured to a rigid frame which is sized and adapted to be placed against a similar frame attached to a wall of said trap;

and means for inflicting an injury to said live bait comprising a cutting implement which is attached to said flexible fingers means to injure said live bait as it passes through the passageway means to enter said trap.

15. The automatic baiter apparatus of claim 14 where said flexible finger means comprises a plurality of flexible fingers molded of plastic and having a variable stiffness which decrease in a direction away from said rigid frame.

16. The automatic baiter apparatus of claim 14 wherein said rigid frame is rectangular and comprises plastic pipe and corner members.

17. The automatic baiter apparatus of claim 14 wherein said flexible finger means form a passageway converging in a direction away from said rigid frame and wherein a means for attracting fish is attached to said flexible finger means.

18. The automatic baiter apparatus of claim 14 comprising means for receiving and retaining said live bait after it has passed through and been injured by the automatic baiter apparatus.

19. In a fish trap of the type that is lowered into and left in the water, the improvement comprising automatic baiter apparatus for obtaining fresh and natural live bait in said trap after the trap has been lowered into the water while inflicting an injury to said live bait, said automatic baiter apparatus comprising:

passageway means for directing a fish into said trap comprising a plurality of flexible fingers spaced apart by a distance exceeding two times the average width of said fingers and converging in a direction into said trap and means for injuring said fish attached to one of said fingers;

means for attracting fish into said passageway means attached to one of said flexible fingers; and means for receiving and retaining said fish in a central region of said trap after it has passed through and been injured by said means for injuring said fish.

* * * * *